(12) United States Patent
Nevis

(10) Patent No.: US 6,903,819 B2
(45) Date of Patent: Jun. 7, 2005

(54) ALIGNMENT METHOD FOR OPTIMIZING EXTINCTION RATIOS OF COATED POLARIZING BEAM SPLITTERS

(75) Inventor: Elizabeth A. Nevis, Lake Oswego, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/864,239

(22) Filed: Jun. 8, 2004

(65) Prior Publication Data

US 2004/0223161 A1 Nov. 11, 2004

Related U.S. Application Data

(62) Division of application No. 09/933,622, filed on Aug. 20, 2001.

(51) Int. Cl.[7] ............................. G01J 4/00; G01B 11/26
(52) U.S. Cl. ....................................... 356/364; 356/138
(58) Field of Search ................................ 356/364–370, 356/138, 614, 615, 622, 399, 400

(56) References Cited

U.S. PATENT DOCUMENTS

| | | | |
|---|---|---|---|
| 2,403,731 A | | 7/1946 | MacNeille |
| 4,859,029 A | | 8/1989 | Durell |
| 5,790,501 A | | 8/1998 | Kase et al. |
| 5,793,487 A | | 8/1998 | Takahashi |
| 6,084,717 A | | 7/2000 | Wood et al. |
| 6,181,420 B1 | * | 1/2001 | Badami et al. ............. 356/487 |
| 6,636,317 B2 | | 10/2003 | Akikuni |
| 6,721,057 B1 | * | 4/2004 | Reininger .................... 356/520 |

OTHER PUBLICATIONS

Austin, Russell, "Thin Film Polarizing Devices" Electro–Optical System Design, pp. 30–35 (Feb. 1974).
Clapham et al., "Some Applications of Thin Films to Polarization Devices" Applied Optics, vol. 8, No. 10, pp. 1965–1974 (Oct. 1969).
Mouchart et al., "Modified MacNeille Cube Polarizer For a Wide Angular Field" Applied Optics, vol. 28, No. 14, pp. 2847–2853 (Jul. 15, 1989).
Netterfield, R.P., "Practical Thin–film Polarizing Beam–splitters" Optica ACta, vol. 24, No. 1., pp. 69–79 (1977).
"Angular Dependence of Polarizing Beam–Splitter Cubes", J. Larry Pezzaniti and Russell A. Chipman, 2219 Applied Optics, 33(1994) Apr. 1, vol. 33, No. 10, Washington, US; G02B27/28B; pp. 1916–1929.
XP000951760; "High Performance Thin–Film Polarizing Beam Splitter Operating at Angles Greater than the Critical Angle", Li Li and J.A. Dobrowolski; Applied Optics; vol. 39, No. 16; Jun. 1, 2000; pp. 2754–2771.

* cited by examiner

Primary Examiner—Michael P. Stafira

(57) ABSTRACT

An optical element such as a beam splitter for interferometer separates a heterodyne beam from the laser into separate beams having different the frequencies and orthogonal polarizations. Optical fibers can conduct the separate beams to a beam combiner for interferometer optics. The PBS and/or the beam combiner can use a coating to reflect one linear polarization and transmit an orthogonal linear polarization. To improve extinction ratios in the PBS or the beam combiner, a yaw angle for an input beam is non-zero and corresponds to a peak in the extinction ratio of a reflected beam.

8 Claims, 4 Drawing Sheets

ALIGNMENT METHOD FOR OPTIMIZING EXTINCTION RATIOS OF COATED POLARIZING BEAM SPLITTERS

CROSS-REFERENCE TO RELATED APPLICATIONS

This patent document is a divisional and claims benefit of the earlier filing date of U.S. patent application Ser. No. 09/933,622, filed Aug. 20, 2001, which is hereby incorporated by reference in its entirety.

BACKGROUND

Two standard types of PBSs include polarizing beams splitters containing birefringent materials (often referred to herein as birefringent PBSs) and polarizing beam splitters using thin-film coatings (often referred to herein as coated PBSs). Generally, coated PBSs are much less expensive and more durable than birefringent PBSs. Additionally, all the materials in a coated PBS can be "factory-made" to a high degree of purity, but calcite, which is the most commonly used birefringent material in birefringent PBSs, currently cannot be artificially manufactured and supplies of calcite found in nature are dwindling.

FIG. 1 shows a cross-section of a coated PBS 100 including a thin-film coating 120 between two pieces of isotropic glass 110 and 130. Glass pieces 110 and 130 are prisms having cross-sections that are isosceles right triangles. Thin-film coating 120 is on one piece of glass (e.g., prism 110) and a glue layer that binds the pieces is on the other piece of glass (e.g., prism 130).

Thin-film coating 120 generally includes multiple layers of two or more materials having different indices of refraction. The layer materials, the number of layers, and the thickness of each layer are selected to transmit light having a first linear polarization P and reflect light having a second linear polarization S.

As illustrated in FIG. 1, an input beam IN containing components with both polarizations P and S is incident normal to the surface of glass 110 and at 45° to the normal of thin-film coating 120. If thin-film coating 120 is properly constructed, a beam TOut, which is transmitted through thin-film coating 120, predominantly contains light having the first polarization P, and a beam ROut, which is reflected from thin-film coating 120, predominantly contains light having the second polarization S. Generally, each output beam TOut and ROut will have polarization components with both polarizations P and S. The ratio of the intensity of the predominant polarization component P or S to the other polarization component S or P is commonly referred to as the extinction ratio.

Coated PBSs generally do not perform as well as birefringent PBSs. Many birefringent PBSs can provide extinction ratios greater than 10,000:1 for both transmitted and reflected beams. Most commercially available coated PBSs produce one "good" polarization (usually the transmitted beam) having an extinction ratio of about 500:1 or better and a not-as-good polarization having an extinction ratio of less than about 200:1. Most optics catalogs and manufacturers specify the extinction ratio of the transmitted beam, and the extinction ratio for the reflected beam (if indicated) is relatively poor.

Many applications, including interferometers and some fiberoptic gyroscopes, require two beams with polarizations that are highly linear and orthogonal, for example, output beams from a PBS having extinction ratios greater than about 1,000:1. These applications have commonly used birefringent beam splitters or added "clean-up" polarizers to the outputs of a coated PBSs. Adding polarizers to the output of a coated PBS increases system cost and complexity and also requires additional alignment processes. Development of better coatings that provide higher extinction levels may be able to achieve high extinction ratios in coated PBSs, but methods for improving the extinction ratios of coated PBSs without increasing system cost and complexity are sought.

SUMMARY

In accordance with an aspect of the invention, an alignment procedure for a coated polarizing beam splitter (PBS) adjusts the yaw angle so that the input beam is at a non-zero angle to the normal of the input surface of the coated PBS. The yaw angle, which is typically less than 10° from the normal, generally has little effect on the extinction ratio of the transmitted beam, but the extinction ratio for the reflected beam varies more rapidly and commonly has a peak within the yaw angle alignment range. The alignment procedure finds the yaw angle providing the best extinction ratio for the reflected beam.

The yaw angle alignment procedure can also improve the performance of a beam combiner by improving rejection of unwanted polarizations from input beams so that a combined beam has linear orthogonal components.

One specific embodiment of the invention is an interferometer that includes a laser, a beam splitter, and interferometer optics. The laser can use Zeeman splitting to produce a heterodyne beam containing two frequency components having different frequencies and circular polarizations, and an optical element such as a quarter-wave plate can convert circular polarizations of two frequency components into orthogonal linear polarizations. The coated beam splitter uses the difference in linear polarizations to split the heterodyne beam into separate beams having different frequencies. To improve performance of the coated PBS, the heterodyne beam has a non-zero incidence angle with the PBS. In particular, the non-zero incidence angle corresponds to a peak in the extinction ratio of a beam reflected in the PBS. With the alignment-enhanced performance, the separate beams have very linear and orthogonal polarizations.

Optical fibers carry the separate beams to the interferometer optics. A beam combiner can recombine the separate beams in to a heterodyne beam used by the interferometer optics to generate measurement and reference beams. The beam combiner can be a coated PBS that is oriented to receive the separate beams at non-zero incidence angles that correspond to a peak in the extinction ratio of a reflected beam in the coated PBS.

Another embodiment of the invention is an optical element such as a coated PBS or a beam combiner that includes a beam splitter coating between first and second pieces of glass. The optical element is oriented to receive an input beam at a non-zero incident angle with a normal to a surface of the first piece of glass. Ideally, the non-zero incident angle corresponds to a peak extinction ratio for a beam reflected from the beam splitter coating.

Yet another embodiment of the invention is a method for aligning an optical element such as a coated PBS or a beam combiner containing a PBS coating. The method includes: directing an input beam along a first axis into the optical element; rotating the optical element to change a yaw angle of incidence of the input beam; observing a reflected beam resulting from reflection of a portion of the input beam in the PBS coating; and mounting-the element at the yaw angle that the observing indicates provides a best extinction ratio for the reflected beam. Observing the reflected beam can include measuring light intensity passing through a polarizer that is in a path of the reflected beam and has a polarization axis orthogonal to a desired polarization of the reflected beam.

In addition to adjusting the yaw angle, the roll and/or the pitch angles can be similarly adjusted. For example, adjusting the roll angle can be performed by: rotating the optical element to change the roll angle of incidence of the input beam; observing a transmitted beam resulting from a portion of the input beam passing through the PBS coating; and mounting the optical element at the roll angle that the observing of the transmitted beam indicates minimizes presence of a first frequency in the transmitted beam. Adjusting the pitch angle can include rotating the optical element to thereby change the pitch angle of incidence of the input beam and adjust a path of a beam resulting from a portion of the input beam reflected by or transmitted through the PBS coating.

BRIEF DESCRIPTION OF THE DRAWINGS

Use of the same reference symbols in different figures indicates similar or identical items.

DETAILED DESCRIPTION

In accordance with an aspect of the invention, an alignment method optimizes the extinction ratio for the reflected beam of a coated polarizing beam splitter (PBS) by adjusting the incident direction of an input beam. The change in incident direction can significantly improve the extinction ratio for the reflected beam without significantly compromising the extinction ratio of the transmitted beam. The alignment method can improve the reflected extinction ratio enough to permit use of a coated PBS in a demanding application such as in a two-frequency interferometer.

Figure 1:
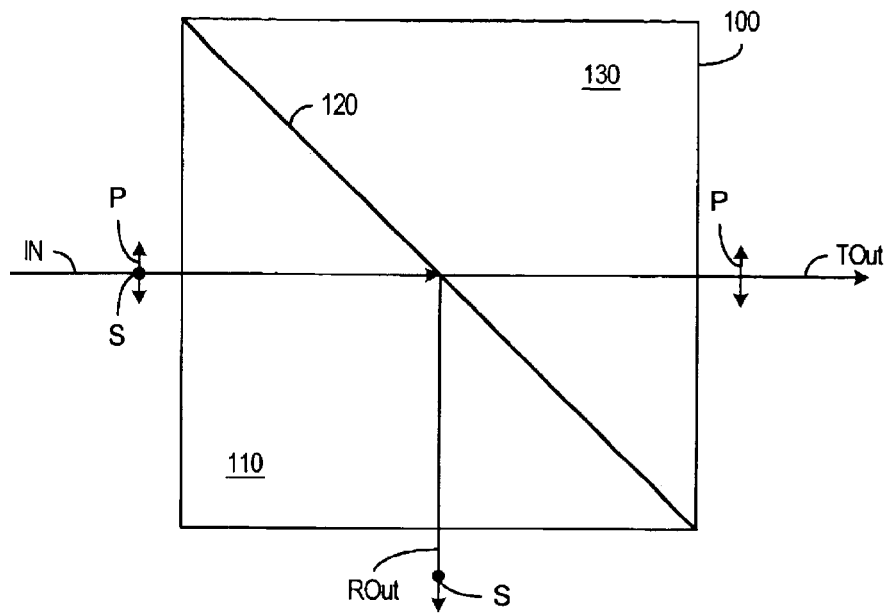
FIG. 1 is a ray trace diagram for a known coated polarizing beam splitter.
Figure 2:
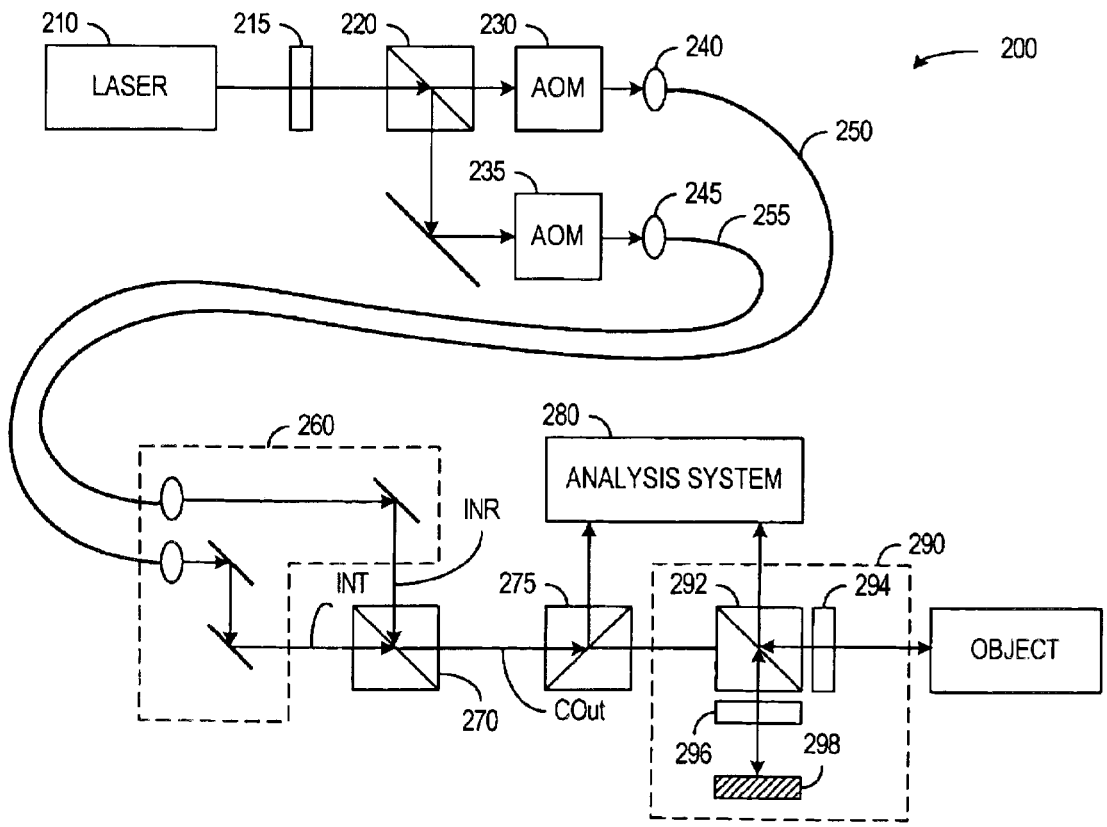
FIG. 2 is a block diagram of a two-frequency interferometer in accordance with an embodiment of the invention.

FIG. 2 is a block diagram of an interferometer system 200 in accordance with an embodiment of the present invention. Interferometer system 200 includes a laser 210, a quarter-wave plate 215, a coated polarizing beam splitter 220, acousto-optical modulators (AOMs) 230 and 235, optical fibers 250 and 255, adjusting optics 260, a beam combiner 270, a beam splitter 275, and interferometer optics 290.

Laser 210 and quarter-wave plate 215 act as a source of a heterodyne beam having two distinct frequency components with orthogonal linear polarizations. An exemplary embodiment of laser 210 is a commercially available He—Ne laser such as a Model 5517D available form Agilent Technologies, Inc., which uses Zeeman splitting to generate the two frequency components in the same laser cavity. Zeeman splitting in this manner can generate a heterodyne beam have frequency components with frequencies f1' and f2' and a frequency difference of about 2 MHz. The two frequency components have opposite circular polarizations, and quarter-wave plate 215 changes the polarizations of the frequency components so that the frequency components have orthogonal linear polarizations.

Coated PBS 220 separates the two frequency components. Coated PBS 220 can be commercially available high quality beams splitter available form Optisigma, Inc. Generally, coated PBS 220 is designed to maximize the extinction ratio of the transmitted beam. To improve the extinction ratio of the reflected beam, polarizing beam splitter 220 is rotated to a yaw angle that provides the best results and the cleanest separation of the frequency/polarization components. Accordingly, the input beam input generally is not normal to the entrance surfaces of polarizing beam splitter 220.

In the illustrated embodiment, the lower frequency component has a polarization that coated PBS 220 transmits to AOM 230, and the higher frequency component has the polarization that coated PBS 220 reflects toward AOM 235. AOMs 230 and 235 operate at different frequencies (e.g., 80 MHz and 86 MHz) and change the frequencies of the two beams to further separate the frequencies of the two beams. The beams output from AOMs 230 and 235 have respective frequencies f1=f1'+80 MHz and f2=f2'+86 MHz that are about 8 MHz apart. The wider frequency separation allows interferometer system 200 to accurately measure faster moving objects.

The embodiment of FIG. 2 uses two AOMs 230 and 235 operating at comparable frequencies (e.g., 80 and 86 MHz). This has the advantage of making the optical paths and influences on the two separate beams more comparable. Additionally, neither AOM needs to be operated at a low frequency (e.g., 6 MHz) to increase the frequency difference by a relatively small amount. However, an alternative embodiment of the invention could employ a single AOM to shift the frequency of one of the beams and thereby increase the frequency difference.

Lenses 240 and 245 focus the separate beams into separate polarization preserving optical fibers 250 and 255, respectively. In an exemplary embodiment of the invention, polarization-preserving optical fibers 250 and 255 are commercially available optical fibers such as available from Corning, Inc. or Fujikura America, Inc. In some applications, optical fibers 250 and 255 may traverse bulkheads or other fixtures. Polarization-preserving fibers 250 and 255 deliver the separate beams to adjustment optics 260 that direct the two beams into a beam combiner 270.

The use of optical fibers 250 and 255 allows the laser 210 and AOMs 230 and 235 to be mounted away from interferometer optics 290. Accordingly, heat generated in laser 210 and AOMs 230 and 235 does not disturb the thermal environment of interferometer optics 290. Additionally, laser 210 and AOMs 230 and 235 do not need to have fixed positions relative to interferometer optics 290, which may provide significant advantages in applications having limited available space near the object being measured.

Adjustment optics 260 precisely align beams INR and INT from optical fibers 250 and 255 for combination in beam combiner 270 to form a collinear beam COut. A variety of optical/mechanical systems can be employed for adjustment optics 260 and generally have configurations that depend on the available space and the maximum curvature of optical fibers 250 and 255 that will sufficiently preserve the intensity and polarization of the beams being carried. A co-filed U.S. patent application entitled "Direct Combination of Fiber Optic Light Beams", Attorney Docket No. 10010323, which is hereby incorporated by reference in its entirety, further describes adjustment optics that position beams for combination.

Beam combiner 270 can be a coated PBS that is used in reverse. In particular, input beam INT, which predominantly has the polarization that the coated PBS transmits, is input along the direction of a desired combined output beam COut. Input beam INR, which predominantly has the polarization that the coated PBS reflects, is input along the direction perpendicular to the desired combined output beam COut. Beams INT and INR generally include polarization components other than those desired in combined output beam COut. These unwanted components can arise from the finite extinction ratios of coated PBS 220 or from AOMs 230 and 235 and fittings or other structures in associated optical fibers 250 and 255 changing the polarization. In accordance with an aspect of the invention, the coated PBS forming beam combiner 270 can be rotated slightly to a yaw angle that maximizes the extinction ratio of the reflected beam.

In an alternative embodiment, beam combiner 270 contains a birefringent material such as calcite. A co-filed U.S. patent application entitled "Birefringent Beam Combiners For Polarized Beams In Interferometers", Att. Docket No. 10010511 describes beam combiners containing birefringent materials and is hereby incorporated by reference in its entirety.

Combined beam COut is input to a beam splitter 275 that reflects a portion of beam COut for analysis systems 280. Analysis system 280 uses the two frequency components of light reflected in beam splitter 275 as first and second references beams. The remaining portion of combined beam COut enters interferometer optics 150.

In interferometer optics 290, a polarizing beam splitter 292 reflects one of the polarizations (i.e., one frequency beam) to form a third reference beam directed toward a reference reflector 298 and transmits the other linear polarization (i.e., the other frequency) as a measurement beam toward an object being measured. In an alternative version of the interferometer optics, a polarizing beam splitter transmits the component that forms the measurement beam and reflects the component that forms the reference beam.

Movement of the object causes a Doppler shift in the frequency of the measurement beam that analysis system 280 measured by combining the measurement beam with the third reference beam to form a beat signal, having a frequency that is equal to the difference between the frequencies of the third reference beam and the measurement beam after reflection from the object. The frequency of this beat signal can be compared to the frequency of a beat signal generated from a combination of the first and second reference beams to accurately determine the Doppler frequency shift. Analysis system 280 analyzes the Doppler frequency shift to determine the speed of and/or distance moved by the object.

For accurate measurements, interferometer system 200 requires that the two frequency components of combined beam COut have orthogonal linear polarizations for clean separation of frequency components in interferometer optics 290. Otherwise, both frequency components will be in the measurement beam and the reference beam introducing other beat frequencies that make measurement of the Doppler shift more difficult and less accurate. Adjusting coated beam splitter 220 to maximize the extinction ratios provides cleaner separation two frequency/polarization components. The extinction ratios of beam combiner 270 also provide additional filtering or rejection of the undesired frequencies.

Figure 3:
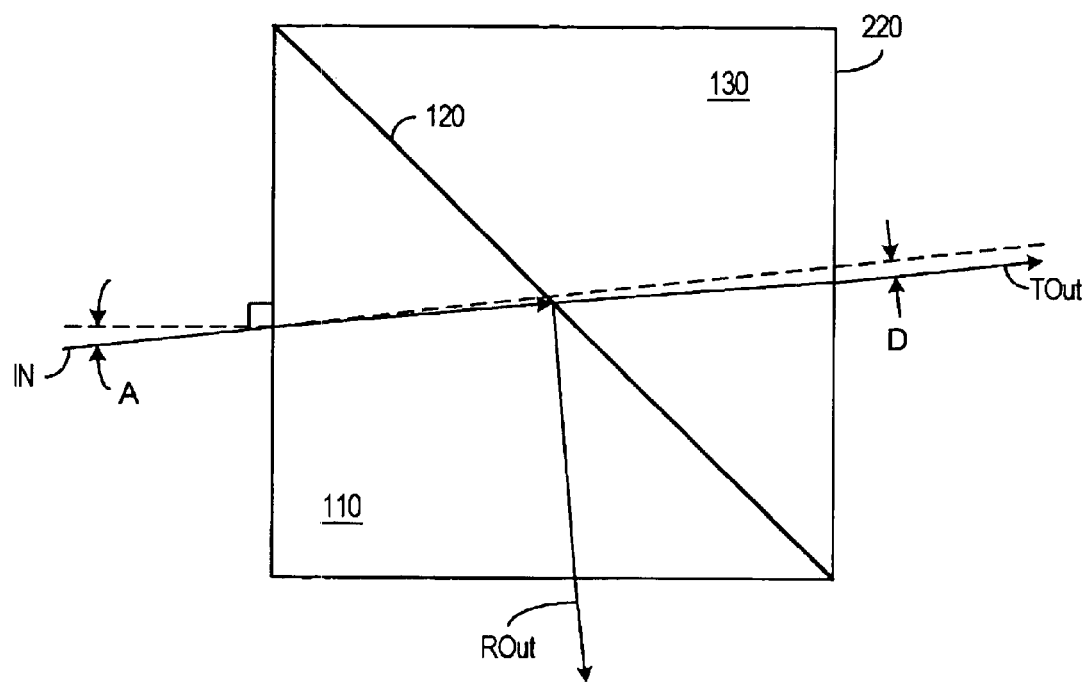
FIG. 3 illustrates the alignment of a coated polarizing beam splitter in accordance with an embodiment of the invention.

FIG. 3 illustrates an embodiment of the invention where an input beam IN is incident on a coated polarizing beam splitter 220 at a non-zero incidence angle A. The non-zero yaw angle A causes refraction of incident beam IN, a transmitted output beam TOut, and a reflected output beam ROut at the air-glass interfaces. In particular, the transmitted output beam TOut is parallel to incident beam IN but not collinear with incident beam IN because refraction shifts output beam TOut by a distance D relative to a straight-line extension of incident beam IN. Refraction causes a similar shift in the reflected beam. In system 200 of FIG. 2, elements such as AOMs 230 and 235 that are downstream of beam coated splitter 220 are aligned to the positions of output beams TOut and ROut after coated beam splitter 220 is aligned for best performance.

Figure 4:
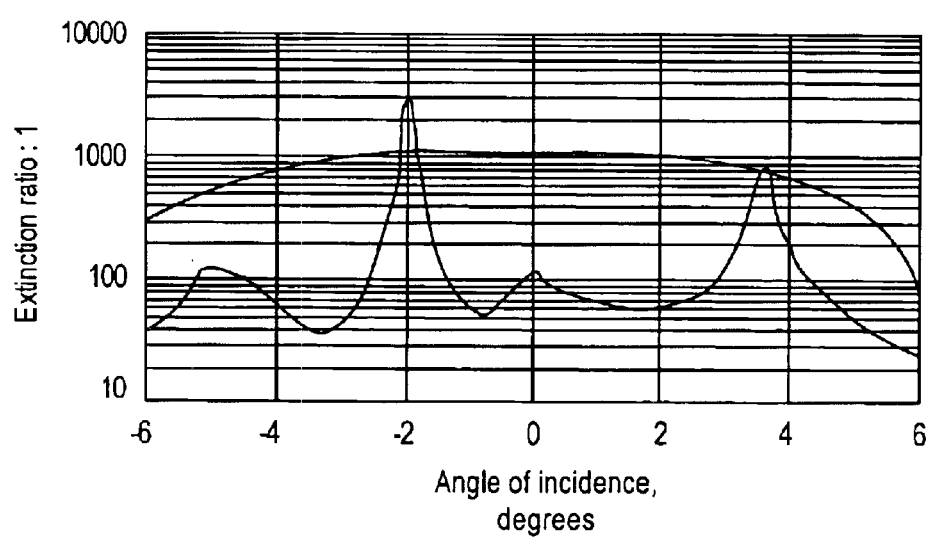
FIG. 4 shows plots illustrating the dependence of the extinction ratios on yaw angle for a typical coated polarizing beam splitter.

Generally, the extinction ratio for transmitted beam TOut of a coated beam splitter is relatively insensitive to the yaw angle, but the extinction ratio for reflected beam ROut has peaks on the order of 0.1° wide. FIG. 4 illustrates example plots 410 and 420 of the transmitted and reflected extinction ratios, respectively of a typical coated beam splitter. As shown in FIG. 4, plot 410 of the extinction ratio for the transmitted beam is peaked about normal incidence but is insensitive to incidence angle over a range of a few degrees. In contrast, plot 420 of the extinction ratio for the reflected beam peaks at a non-zero incident angle and has several local maxima and minima. For extinction ratios behaving as illustrated in FIG. 4, an optimal yaw angle of about −2° provides best performance.

The locations of the peaks in extinction ratio for the reflected beams can be theoretically or experimentally predicted if the optimal yaw angle is reasonably consistent from lot to lot of coated beam splitters. However, the exact location of the best peak can depend on process variations in the manufacture of the beam splitter coating, and an alignment process is required for each coated PBS to locate the optimal yaw angle.

Figure 5:
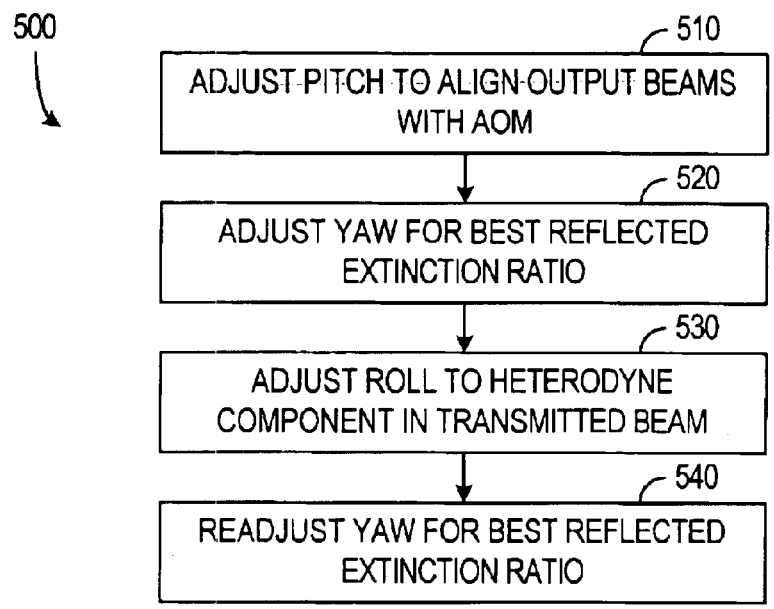
FIG. 5 is a flow diagram of a process for aligning a coated beam splitter in accordance with an embodiment of the invention.

FIG. 5 is a flow diagram illustrating an alignment process 500 for coated beam splitter 220 in interferometer 200 of FIG. 2. Before alignment process 500, laser 210 and quarter-wave plate 215 are set up to provide input beam 210, which is a heterodyne beam having two frequencies f1' and f2'.

Alignment process 500 begins in 510 by adjusting the pitch angle of coated beam splitter 220. The pitch angle is about a horizontal axis perpendicular to input beam IN, and adjusting the pitch angle adjusts the plane of the output beams TOut and ROut. Pitch adjustment can be used to keep the output beams parallel to a base plate for the mounting structure. The pitch angle generally has little or no effect on the frequency purity of output beams.

Step 520 then adjusts the yaw angle, which is about a vertical axis that is perpendicular to the input beam. Yaw angle adjustment step 520 rotates coated PBS 220 to an orientation that maximizes the extinction ratio of the reflected beam. The optimal yaw angle can be identified by positioning a linear polarizer with a polarization axis orthogonal to the desired polarization of the reflected beam. Coated beam splitter 220 is then rotated until a minimum is found in the light intensity transmitted through the polarizer.

After the optimal yaw angle is found, step 530 adjusts the roll angle to assure that coated PBS 220 optimally separates the frequency components of the heterodyne beam from laser 210. The roll angle, which is about the axis of input beam IN, is adjusted to minimize one frequency component in the transmitted beam TOut. In particular, a linear polarizer is positioned with a polarization direction at about 45° to the desired polarization of the output beam TOut. (The 45° orientation of the polarizer can be established before coated PBS 220 is in place.) With coated PBS 220 in place, frequency variations at the beat frequency f2'−f1' are observed, while coated beam splitter 220 is rotated around the axis of input beam IN to an orientation that minimizes the beat frequency component.

After the roll angle has been optimized, step 540 readjusts the yaw angle to maximize the extinction ratio of the reflected. Readjustment corrects for any changes to that roll angle adjustment (step 530) may have had on the extinction ratio of the reflected beam. Since the yaw angle is readjusted after roll angle adjustment, the first yaw angle adjustment in step 520 can be a coarse adjustment, while the yaw angle adjustment in step 540 performs a finer adjustment. When coated PBS 220 has its optimal orientation, the extinction ratios for both transmitted and reflected output beams TOut and ROut and the wave distortion can be checked to confirm that coated beam splitter 220 provides the required performance.

A mounting structure for a coated PBS of a type currently available commercially should provide an adjustment range of about +/−75 mrad and a resolution of about 0.5 mrad for the roll, pitch, and yaw angles of the coated PBS. One mounting structure that achieves the desired range and resolution of roll, pitch, and yaw angles uses a section of a sphere held in contact with a conical base. The coated PBS is mounted on the spherical section with a center of the sphere at target point in the PBS coating. The contact of the spherical section with the conical base allows rotation or adjustment of any of the roll, pitch, or yaw angles without translation of the coated PBS. When the coated PBS is properly positioned, it can be fixed in place by gluing the spherical section to the conical base. The mounting structure may additionally provide a translation adjustment of the PBS for fine adjustment of the horizontal position of the reflected beam. However, translation adjustment may not be necessary if the mounts and/or sizes of optical elements immediately downstream of the coated PBS can adjust to or accommodate changes in output beam positions resulting from the alignment of the coated PBS.

Figure 6:
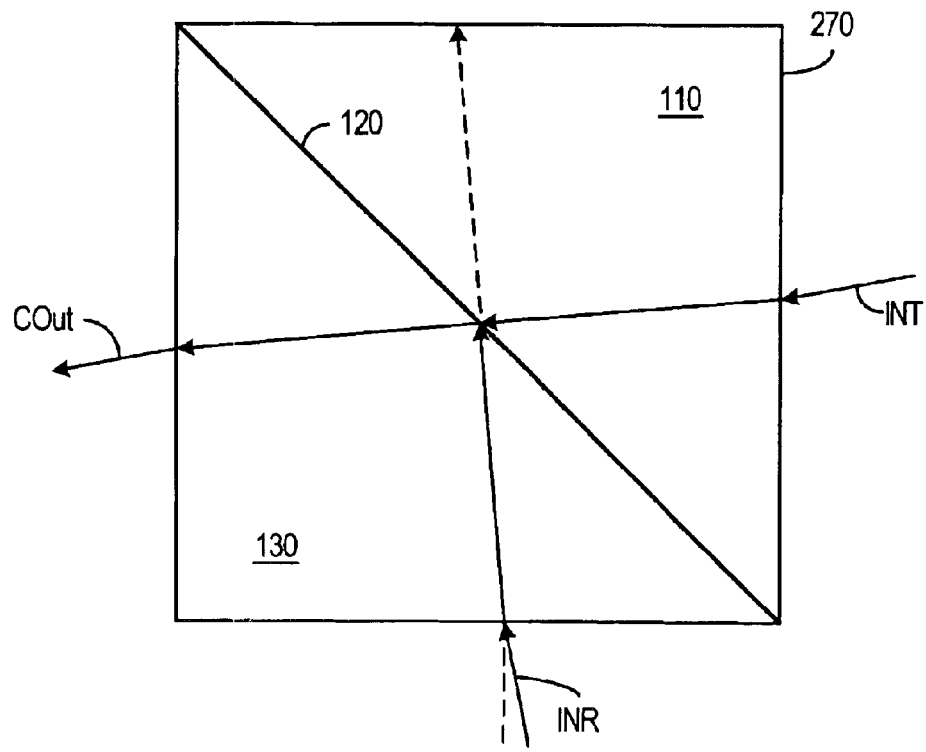
FIG. 6 illustrates the alignment of beam combiner in accordance with an embodiment of the invention.

As noted above, the performance of a beam combiner can also benefit from yaw angle adjustment. FIG. 6 shows a beam combiner 270 having input beams INR and INT at non-zero incident angles. Adjustment optics 260 controls the relative angle and separation between input beams INT and INR. Generally, input beams INR and INT are co-planar and about perpendicular to each other. Adjustment optics 260 and the mounting structure for beam combiner 270 can co-operatively adjust the roll, pitch, and yaw angles of input beams INR and INT and adjust the points at which input beams INR and INT are incident on beam combiner 270.

Figure 7:
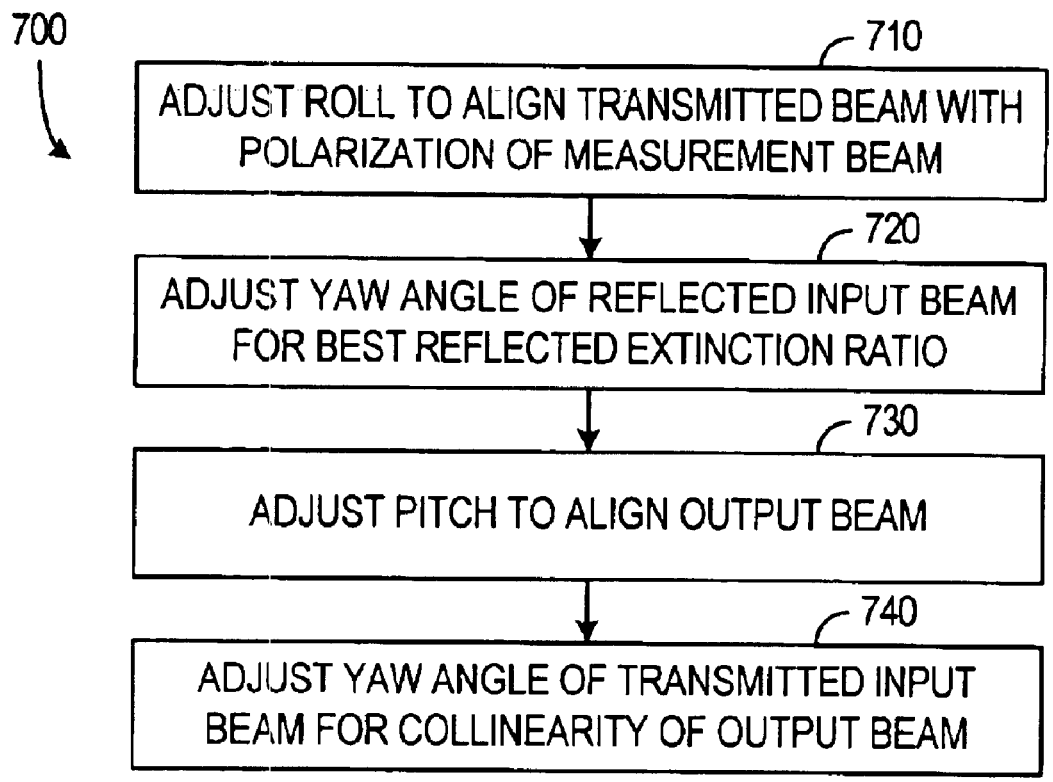
FIG. 7 is a flow diagram of a process for aligning a beam combiner in accordance with an embodiment of the invention.

FIG. 7 is a flow diagram of an alignment process 700 for beam combiner 270. Alignment process 700 starts with adjusting the roll angle of beam combiner 270 so that the output polarization axes respectively correspond to the polarization axes of the measurement and reference beams in interferometer optics 290. Adjustment optics 260 can rotate input beams INT and INR so that their polarizations match the polarization axes of beam combiner 270.

Step 720 adjusts the yaw angle of input beam INR to maximize the extinction ratio of the reflected beam. To determine the optimal yaw angle, input beam INT can be blocked so that output beam COut contains only the reflection of input beam INR. The yaw angle is then adjusted to minimize the light intensity passing through a polarizer having a polarization axis perpendicular to the desired polarization of the reflected beam.

Step 730 uses the pitch angle of beam combiner 270 for adjustment of the output beam COut. Step 740 then adjusts the yaw angle and incident point of input beam INT to make the transmitted portion of combined beam COut collinear with the reflected portion of combined beam COut.

As described above, the yaw angle of coated beam splitter can be adjusted to maximize the extinction ratio of the reflected beam. Accordingly, a less-expensive coated beam splitter can be used in high performance applications that previously had required expensive birefringent polarizing beam splitters. The yaw angle adjustment is also applicable to beam combiner to provide better performance.

One application of the coated beam splitters and combiners in accordance with the invention is an interferometer, which uses the beam splitter to separate frequency/polarization components of a heterodyne beam from a two-frequency laser. AOMs can then increase the frequency difference between the separated beams before the separate beams are transmitted via separate optical fibers to interferometer optics. At the interferometer optics, a beam combiner can combine the two separate beams into a heterodyne beam having two frequency components with highly linear and orthogonal polarizations.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A method for aligning an optical element containing a polarizing beam splitter coating, comprising:

directing an input beam along a first axis into the optical element;

rotating the optical element to change an angle of incidence of the input beam on the polarizing beam splitter coating;

observing an output beam from the polarizing beam splitter coating; and mounting the optical element at the angle that the observing indicates provides a best extinction ratio for the output beam.

2. The method of claim 1, wherein the angle changed by rotating the optical element is a yaw angle of the incidence of the input beam.

3. The method of claim 2, further comprising rotating the optical element to change a pitch angle of incidence of the input beam and adjust a path of a beam resulting from a portion of the input beam reflected by the polarizing beam splitter coating.

4. The method of claim 2, wherein the output beam comprises a reflected beam resulting from reflection of a portion of the input beam from the polarizing beam splitter coating.

5. The method of claim 3, further comprising:

rotating the optical element to change a roll angle of incidence of the input beam;

observing a transmitted beam resulting from a portion of the input beam passing through the polarizing beam splitter coating; and mounting the optical element at the roll angle that the observing of the transmitted beam indicates minimizes presence of a first frequency in the transmitted beam.

6. The method of claim 1, wherein the optical element comprises a polarizing beam splitter.

7. The method of claim 1, wherein the optical element comprises a beam combiner.

8. The method of claim 1, wherein observing the output beam comprises:

placing in a path of the output beam a polarizer having a polarization axis orthogonal to a desired polarization of the output beam; and measuring light intensity passing through the polarizer.

* * * * *